July 12, 1966  J. C. ZOLOT  3,260,472
CORD REEL

Filed Dec. 3, 1964  2 Sheets-Sheet 1

INVENTOR.
JACQUES C. ZOLOT
BY
ATTORNEY

July 12, 1966  J. C. ZOLOT  3,260,472
CORD REEL

Filed Dec. 3, 1964  2 Sheets-Sheet 2

INVENTOR.
JACQUES C. ZOLOT
ATTORNEY

United States Patent Office 3,260,472
Patented July 12, 1966

3,260,472
CORD REEL
Jacques C. Zolot, Elizabeth, N.J.
Filed Dec. 3, 1964, Ser. No. 415,634
14 Claims. (Cl. 242—107.12)

This application is a continuation-in-part of co-pending application Serial No. 347,726, filed on February 27, 1964, now abandoned, by Jacques C. Zolot.

The present invention relates to a small reel which is to be used with cords, such as electric wire cords, in order to prevent tangling and twisting thereof and to enable the reeling in or out of the desired length of cord. More specifically, it deals with a self-retracting cord reel having a helical groove deep enough to accommodate almost two thicknesses of cord and having guide bars or a housing designed to prevent bunching up of the cord on the reel.

Various retractable reels have been disclosed in the art. However, they have been found to be deficient with respect to marketing appeal and effectiveness in use in that they are too bulky or that they suffer from bunching up of the cord on the reel, making the reel unsightly as well as difficult to unreel.

According to the present invention, a compact retractable reel is provided which employs a high helix wall for winding almost two thicknesses of cord, whereby the width of the reel is considerably reduced. Other features include a cord lock, etc.

Figure 1:
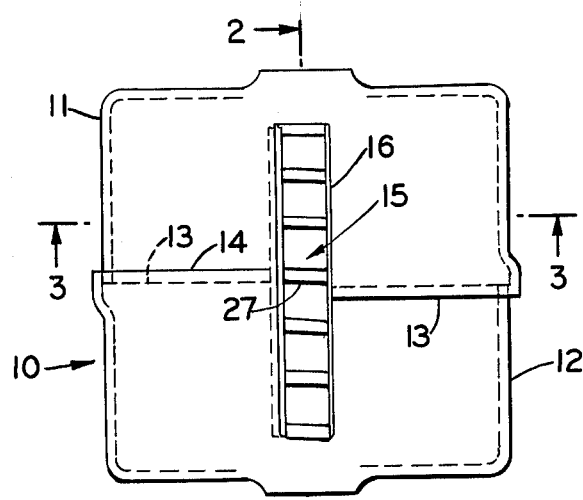
Figure 3:
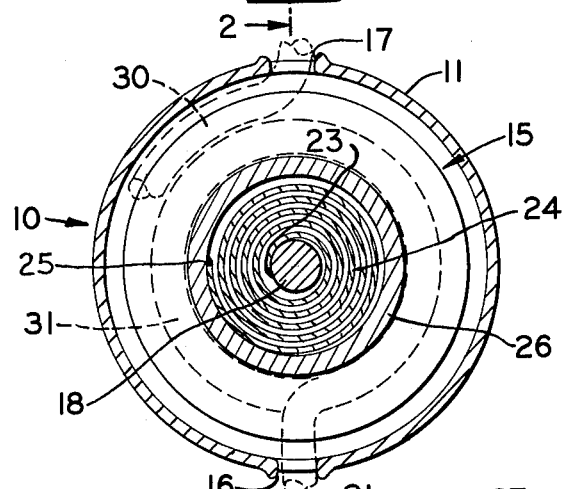
Figure 2:
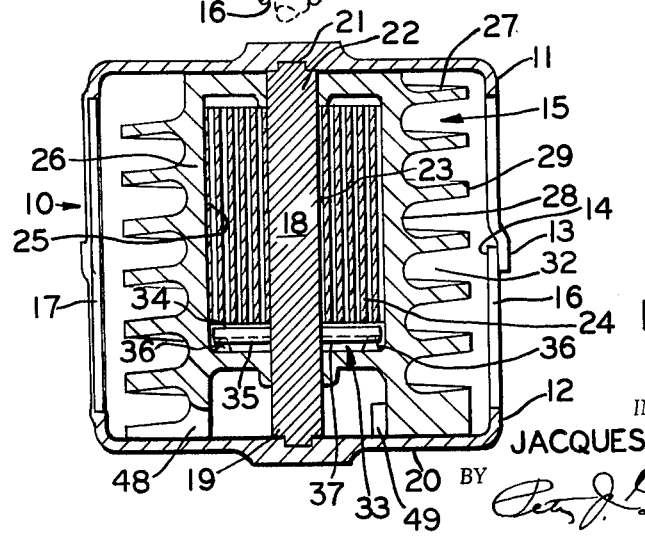
Figure 4:
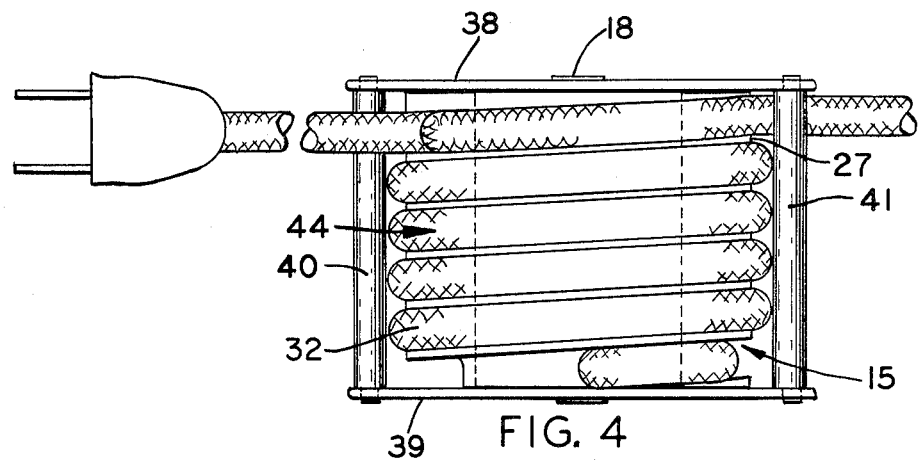
Figure 5:
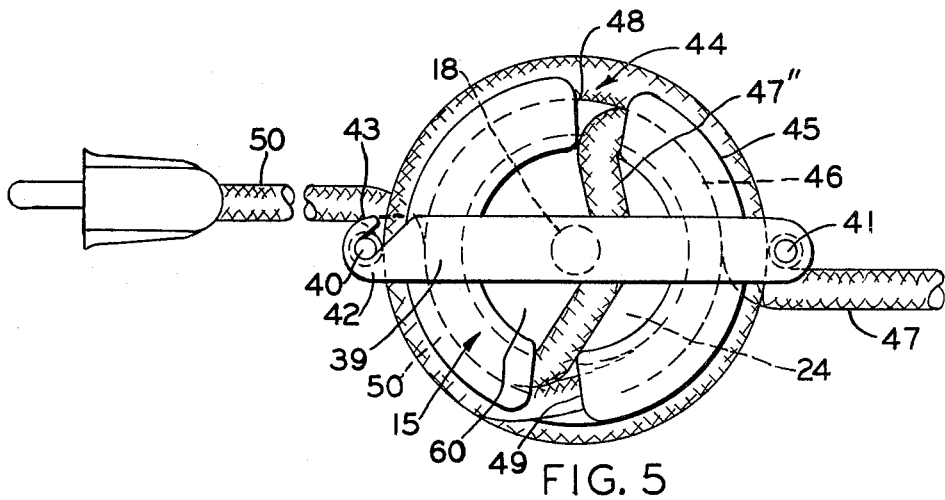
Figure 6:
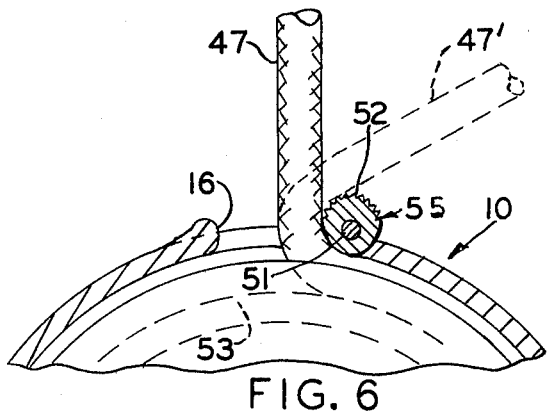

The invention will be more readily understood by reference to the accompanying drawings, in which a preferred embodiment is described, and in which FIGURE 1 illustrates a top view of a housing-covered reel of the present invention, while FIGURE 2 depicts a cross-sectional view taken along the plane of line 2—2 in FIGURE 1. FIGURE 3 presents a cross-sectional view taken along the plane of lines 3—3 in FIGURE 1. FIGURE 4 shows a top view of an open reel of the present invention, while FIGURE 5 illustrates an end view thereof. FIGURE 6 presents a schematic cross-sectional end view of a reel similar to that in FIGURES 1 and 3, with the exception that the latter is provided with a cord lock of the present invention. The same numerals refer to similar parts in the various figures.

Referring again to the drawings, and particularly to FIGS. 1–3, numeral 10 designates generally a housing shell made of plastic, metal, or other suitable material, and constructed of two halves 11 and 12, which may be snapped together at their ends 13 and 14, respectively, in locking relation, to enclose the reel, indicated generally as 15. Housing 10 has two axially aligned slot openings 16 and 17 through which the cord is fed onto or off the reel.

Shaft 18 is affixed at its one end 19 to end 20 of housing side 12, while housing half 11 has a recess 21 in its end, into which shaft end 22 is inserted when both housing halves are locked together.

Attached to shaft 18 is one end 23 of helical leaf spring 24, while the other end 25 of spring 24 is attached to the cavity wall 26 within reel 15 in a manner such that as the reel 15 is rotated, in the feeding out direction, spring 24 becomes tensioned.

Reel 15 is provided with a continuous spiral fin 27 having a height such that the depth of the space 32 between the fin helixes, from the bottom 28 to the top 29 of the helix, is adequate to accommodate one thickness of cord 31 plus at least over one-half of another cord thickness 30 (FIG. 3). The spacing or pitch between the fin helixes is just adequate to accommodate one thickness of cord. The distance of the top end 29 of helical fin 27 from the inner wall of housing 10 is less than the thickness of cord 30, thus making it impossible for the cord to cross the top 29 of the helix during winding of the cord on the reel. Reel 15 has the same structure in FIGURES 1 and 3 as in FIGURES 4 and 5, and the cord is attached, wound and unwound in the same manner.

Reel 15 also may be provided with a clutch of conventional type, such as the clutch indicated generally as 33 in FIG. 2. Such a clutch may be a plate 34 attached to shaft 18, and having a corrugated face 35 in frictional contact with protrusions 36 on inner cavity end wall 37 of reel 15. The friction of protrusions 36 on clutch face 35, when the reel is stopped, is adequate to resist the tension of spring 24 and hold the cord in place unless the reel is again turned.

In FIGS. 4–5, a cord reel of the present invention is shown without a closed housing. Frame ends 38 and 39 are used to hold shaft 18. Guide bars 40 and 41 connect the ends of frame members 38 and 39, and end 42 of frame member 39 may have a hook 43 from which guide bar 40 may be disconnected to remove reel 15 and to wind cord 44 thereon.

Cord 44 is mounted on reel 15 as follows: About two-fifths of the cord length is measured off and, after the reel has been rotated to the required tension, the longer cord portion at the aforesaid measured mark is looped over end 45 of fin 27, in space 32 (as loop 46), one end of the longer cord 47 being led through opening 48 in terminal fin 45, end 47" being crossed over the end of the reel (under frame member 39), within a hollowed portion 60 of the reel end, and then led through opening 49 in fin 45 and back into space 32 between the fins, as end 50 of the cord, which latter end is fed under guide bar 40. The other end 46 of the cord is fed under guide bar 41. When tension is released, spring 24 winds the cord between the fins in a double layer. With this arrangement, one of the cord ends is superimposed over the other, and they both unwind in the same direction, although the top cord layer 47 is drawn from under bar 41, while the bottom cord layer 50 (on reel 15) is drawn from under bar 40. The reel of FIGURES 4 and 5 is provided with a clutch, such as clutch 33 shown in FIGURE 2.

An important feature of the present invention is the spacing of the guide bars (or housing shell) with respect to the top of the reel fin. This distance is less than the thickness of the cord employed. Thus, it can be seen that with the high fin employed on the reel, and the controlled spacing of the guide bars (or housing wall) with respect to the fin tip, a compact reel is provided which employs a double layer of cord, and no bunching of the cord is possible during the winding operation.

In FIG. 6 there is shown a locking feature which may be employed in lieu of a clutch, if desired. In the case of the housed reel shown in FIGS. 1–3, slot opening 16–17 in housing 10 is made wider to accommodate a guide bar 55, extending the length of the slot and pivoted on shaft 51. This is similar to guide bar 40 in FIGS. 4–5, except that shaft 51 is off-center with respect to the cross-section of bar 55, and the outer periphery 52 (i.e., the portion of bar 55 having the greater radius with respect to shaft 51) is roughened by corrugating or the like, so that when cord 47 is wound or tilted more over bar 55, as in portion 47', the rough surface of bar 55 is engaged, and bar 50 turns (when the cord is given some slack) to act as a cam, and it presses cord section 47 downwardly against the lower layer 53, and thus locks the cord in that position. In FIG. 4, such cam portion of guide bar 41 is indicated by broken lines as 54, for use when the cam portion is used in lieu of clutch 33.

In the case of the reel of the present invention, carrying the locking bar 55 or 54, the depth of space 32 between the helixes should accommodate one thickness of lower cord portion 31 plus about 60% to about 90% of the thickness of the upper cord portion 30, which means that some of the thickness of the upper cord portion 30 will extend beyond the upper edge 29 of fin 27, thereby enabling locking of the reel by the cam action of bar portion 52 or 54 upon the thus-exposed portion of the upper cord portion 30. However, the helix depth can exceed two thicknesses of cord, in which case the housing wall at slot openings 16–17, or the guide bars 40 and 41 are to be positioned a distance less than a cord thickness away from the tops 29 of the helix, and brake 55 or 54 then acts as a cam against the helix tops 29.

From the foregoing, it will become apparent that one important feature of the present invention resides in the fact that the ends of the cord need not be disturbed for mounting the reel thereon as the cord may be inserted over the reel end after one frame end member has been disconnected or removed. This feature is not present in reels of the prior art.

I claim:

1. A retractable cord reel of the type from which a cord end is unreeled from both sides thereof, comprising, in combination,
    a housing comprising a frame having two interconnecting members,
    a shaft centrally disposed between said end members and affixed to at least one of said end members,
    a reel having ends and rotatably disposed around said shaft and having an inner annular recess therein and adjacent said shaft, said recess having a wall,
    a coiled spring disposed around said shaft in said recess and having one end affixed to said shaft and the other end affixed to said recess wall,
    a helical fin disposed in the outer periphery of said reel and having a pitch adequate to accommodate one thickness of a cord to be reeled, and having a helix depth adequate to accommodate at least one thickness of cord portion plus over one-half of the thickness of another cord portion, said helix fin having oppositely-disposed fin openings at one end designed to allow the leading of a portion of the cord from the bottom of the end helix fin through one fin opening, around the end of said reel and through the other fin opening to the top of the same helix end, and joining the other cord portion in double layer relation therewith, each portion being drawn out past one of the cross members of said frame, and
    releasable holding means mounted within said frame and designed to releasably hold said cord in any extended position.

2. A retractable cord reel according to claim 1 in which the fin opening reel end is provided with a hollow to provide space for passage of a cord portion around the end of said reel.

3. A retractable cord reel according to claim 2 having a clutch mounted around said shaft and serving as said releasable holding means and designed to hold said reel stationary against the force of said spring.

4. A retractable cord reel according to claim 2 in which the depth of the helical fin is adequate to accommodate one thickness of a cord portion plus about 60% to about 90% of the thickness of another cord portion, and the frame cross members are positioned away from the tops of the helix by a distance less than the thickness of a cord.

5. A retractable cord reel according to claim 2 in which said frame has frame interconnecting cross members, one of which is mounted on said frame in axial alignment above said reel and is designed as said releasable holding means to serve as a brake to hold said reel stationary against the force of said spring.

6. A retractable cord reel according to claim 5 in which said latter cross member is a bar disposed in offset position on a shaft and designed to exert a cam effect on said reel.

7. A retractable cord reel of the type from which a cord end is unreeled from both sides thereof, comprising, in combination,
    a housing comprising two shell halves designed to lock together at their ends, and having two oppositely-disposed axially-positioned slot openings,
    a shaft centrally disposed between said shell halves and having one end fixed to one shell half and the other end riding in a recess in the other shell half,
    a reel rotatably disposed around said shaft and having an inner annular recess therein and adjacent said shaft, said recess having a wall,
    a coiled spring disposed around said shaft in said recess and having one end affixed to said shaft and the other end affixed to said recess wall,
    a helical fin disposed in the outer periphery of said reel and having a pitch adequate to accommodate one thickness of a cord to be reeled, and having a helix depth adequate to accommodate at least one thickness of cord portion plus over one-half of the thickness of another cord portion, said helix having oppositely-disposed openings at one end designed to allow the leading of a portion of the cord from the bottom of the end helix fin through one fin opening, around the end of said reel and through the other fin opening to the top of the same helix end, and joining the other cord portion in double layer relation therewith, one cord portion being drawn out of one of the slot openings while another end of a cord is led through the other slot opening in said housing, and
    releasable holding means mounted within said housing and designed to releasably hold said cord in any extended position.

8. A retractable cord reel according to claim 7 in which said releasable holding means comprises a clutch mounted around said shaft and designed to hold said reel stationary against the force of said spring.

9. A retractable cord reel according to claim 7 in which the housing wall at the slot openings is disposed a distance of less than a cord thickness away from the top edge of said helical fin.

10. A retractable cord reel according to claim 9 in which the depth of the helical fin is adequate to accommodate one thickness of a cord portion plus about 60% to about 90% of the thickness of another cord portion.

11. A retractable cord reel according to claim 9 in which a cross member is mounted alongside one slot opening in axial alignment above said reel and designed as said releasable holding means to serve as a brake to hold said reel stationary against the force of said spring.

12. A retractable cord reel according to claim 2 wherein said frame has frame interconnecting cross members, one of which is disconnectable from one of said frame members.

13. A retractable cord reel according to claim 4 in which said reel carries a cord, a portion of said cord being led from the bottom of the end helix fin through one fin opening, then around the end of said reel and through the other fin opening to the top of the same helix end and then is joined with the other cord portion in double layer relation therewith, each cord portion being drawn past one of the cross members of said frame.

14. A retractable cord reel according to claim 10 in which said reel carries a cord, a portion of said cord being led from the bottom of the end helix fin through one fin opening, then around the end of said reel and through the other fin opening to the top of the same helix end and then is joined with the other cord portion in double layer relation therewith, one cord portion being drawn out of one of the slot openings while the other of the cord is led through the other slot opening in said housing.

References Cited by the Examiner
UNITED STATES PATENTS

| | | | |
|---|---|---|---|
| 451,996 | 5/1891 | Dow | 292—107.12 |
| 747,571 | 12/1903 | Ackermann et al. | 191—12.2 |
| 906,696 | 12/1908 | Emigh | 242—107.12 |
| 1,070,684 | 8/1913 | Harter | 242—107.12 |
| 1,658,694 | 2/1928 | Sturge | 242—107.12 |
| 1,953,581 | 4/1934 | Ballou. | |
| 2,108,111 | 2/1938 | Ehrlich | 191—12.2 X |

MERVIN STEIN, *Primary Examiner.*

STANLEY N. GILREATH, *Examiner.*

W. S. BURDEN, *Assistant Examiner.*